Patented July 6, 1948

2,444,858

UNITED STATES PATENT OFFICE 2,444,858

ORGANOSILICON COMPOSITION AND METHOD OF PREPARING IT

John L. Speier, Pittsburgh, Pa., assignor to Corning Glass Works, Corning, N. Y., a corporation of New York No Drawing. Application February 13, 1946, Serial No. 647,423

2 Claims. (Cl. 260—448.2)

This invention relates to new chemical compositions and their preparation and, more particularly, to a new organo-silicon composition and to the method of making it.

It is an object of the present invention to prepare trimethylsilylmethylpentamethyldisiloxane whose structural formula is as follows:

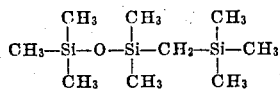

Other objects and advantages of this invention will become apparent from the following description.

In accordance with this invention, chlormethylpentamethyldisiloxane is reacted with magnesium in anhydrous ether. The reaction product is then reacted with trimethylsilicon chloride to yield a crude mixture from which the desired compound, trimethylsilylmethylpentamethyldisiloxane, may be recovered in a pure state by fractional distillation.

Trimethylsilylmethylpentamethyldisiloxane is a liquid boiling at 179.4° C. at 734.8 mm. pressure and melting at about −105° C. Its refractive index at 20° C. is 1.4136; its density at 22° C. is 0.8038. The following table tabulates its viscosity at several temperatures.

Table

| Viscosity, Centistokes | Temperature, ° C. |
|---|---|
| 1.914 | 2.0 |
| 1.287 | 30.0 |
| .657 | 99.3 |

The power factor of this new liquid is less than .004%; its dielectric constant is 2.18.

The above properties adapt the composition of my invention to such applications as hydraulic or damping fluids, heat transfer media, and as dielectric liquids.

For a better understanding of my invention, reference should be had to the following example which is included by way of illustration only.

Example 200 ccs. of monochlormethylpentamethyldisiloxane were dissolved in 500 ccs. of anhydrous ethyl ether. To the solution was added an excess of magnesium shavings. The reaction was carried out in a flask under a reflux condenser. Reaction started immediately with the production of sufficient heat to cause the solution to reflux and continued for approximately 3 hours. The reaction mixture was allowed to stand overnight to insure completion of the reaction.

100 grams of trimethylsilicon chloride were added to the above reaction product. A slow reaction started and after a few minutes a white precipitate of magnesium chloride formed. Precipitation of the magnesium chloride continued for several hours, the heat of reaction being sufficient to cause refluxing of the mixture. After four hours the mixture was a white paste. This was allowed to stand for 24 hours, following which water was added to dissolve the precipitate. The etheral layer was then separated and dried over sodium sulfate. The dried product was fractionally distilled and 150 ccs. of a fraction boiling at 179.4° C. at 734.8 mm. were collected. This fraction was established to be trimethylsilylmethylpentamethyldisiloxane.

I claim:

1. Trimethylsilylmethylpentamethyldisiloxane.
2. The method which comprises the steps of reacting monochlormethylpentamethyldisiloxane with magnesium in anhydrous ether, reacting the product thereof with trimethylsilicon chloride, and recovering trimethylsilylmethylpentamethyldisiloxane from the final reaction product.

JOHN L. SPEIER.

REFERENCES CITED

The following references are of record in the file of this patent:

UNITED STATES PATENTS

| Number | Name | Date |
|---|---|---|
| 2,352,974 | Rochow et al. | July 4, 1944 |

OTHER REFERENCES

Whitmore, "Jour. Am. Chem. Soc.," vol. 68 (1946), pages 475–81.